United States Patent [19]

Howard

[11] Patent Number: 4,546,682
[45] Date of Patent: Oct. 15, 1985

[54] METHOD AND APPARATUS FOR OPERATING A BAND SAW

[75] Inventor: L. Brewster Howard, West Springfield, Mass.

[73] Assignee: American Saw & Mfg. Company, East Longmeadow, Mass.

[21] Appl. No.: 649,077

[22] Filed: Sep. 10, 1984

Related U.S. Application Data

[63] Continuation-in-part of Ser. No. 451,976, Dec. 21, 1982, abandoned.

[51] Int. Cl.[4] ............................................. B23D 53/04
[52] U.S. Cl. ......................................... 83/13; 83/794; 83/801; 83/820
[58] Field of Search ................. 83/788, 789, 794, 799, 83/800, 801, 820, 13

[56] References Cited

U.S. PATENT DOCUMENTS 3,077,132  2/1963  Whitmore .......................... 83/794 X
4,127,045  11/1978  Blucher et al. .................... 83/801 X

FOREIGN PATENT DOCUMENTS 2330023  1/1974  Fed. Rep. of Germany ........ 83/794
107729  7/1982  Japan .................................... 83/789
163020  10/1982  Japan .................................... 83/789

*Primary Examiner*—Frank T. Yost
*Attorney, Agent, or Firm*—Chapin, Neal & Dempsey

[57] ABSTRACT

Method and apparatus for operating a band saw blade which is disposed in a continuous loop about a pair of spaced wheels in a band saw housing. One of the wheels is driven to impart longitudinal cutting movement to the blade. The blade is alternately tilted from a first to a second extreme cutting angle relative to the work. The tilting movement of the blade has a predetermined cycle so that for a major portion of each cycle, the blade dwells at its extreme angles of tilt relative to the work. One apparatus for carrying out this method is an eccentric drive which oscillates the entire housing of the band saw in the predetermined cycle. Another apparatus is a mechanism which alternately deflects the cutting span of the blade to change its angular orientation relative to the work piece in the predetermined cycle.

8 Claims, 6 Drawing Figures

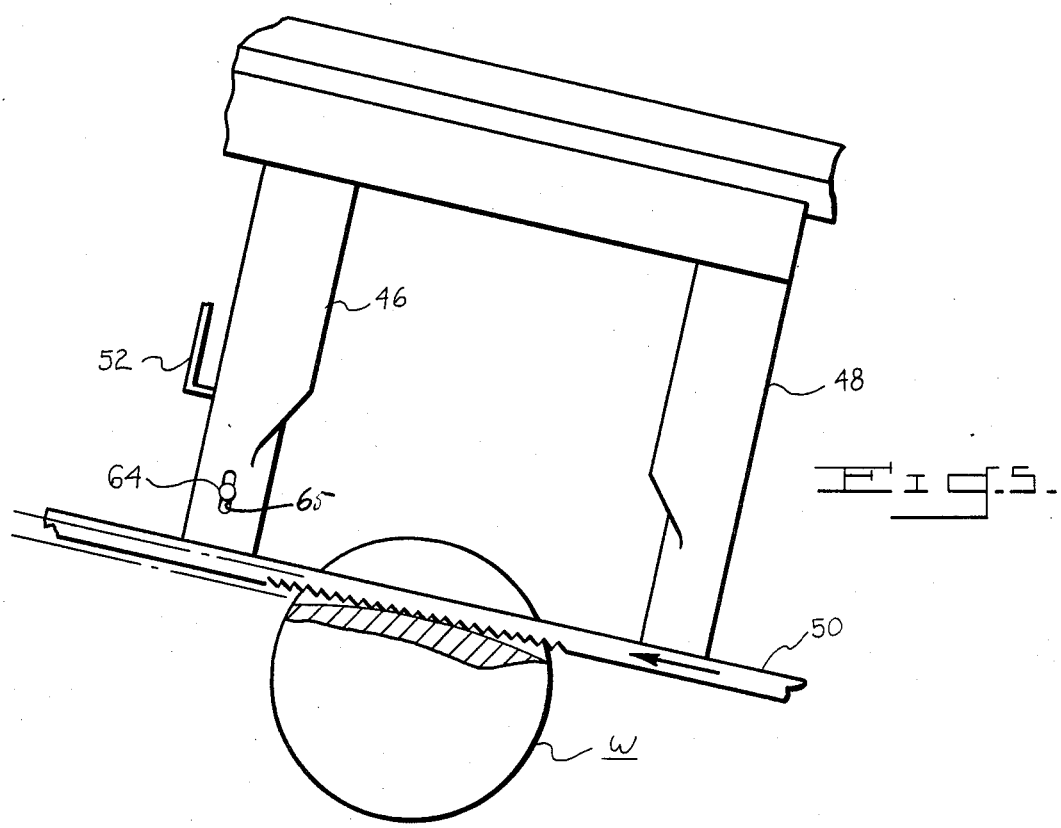
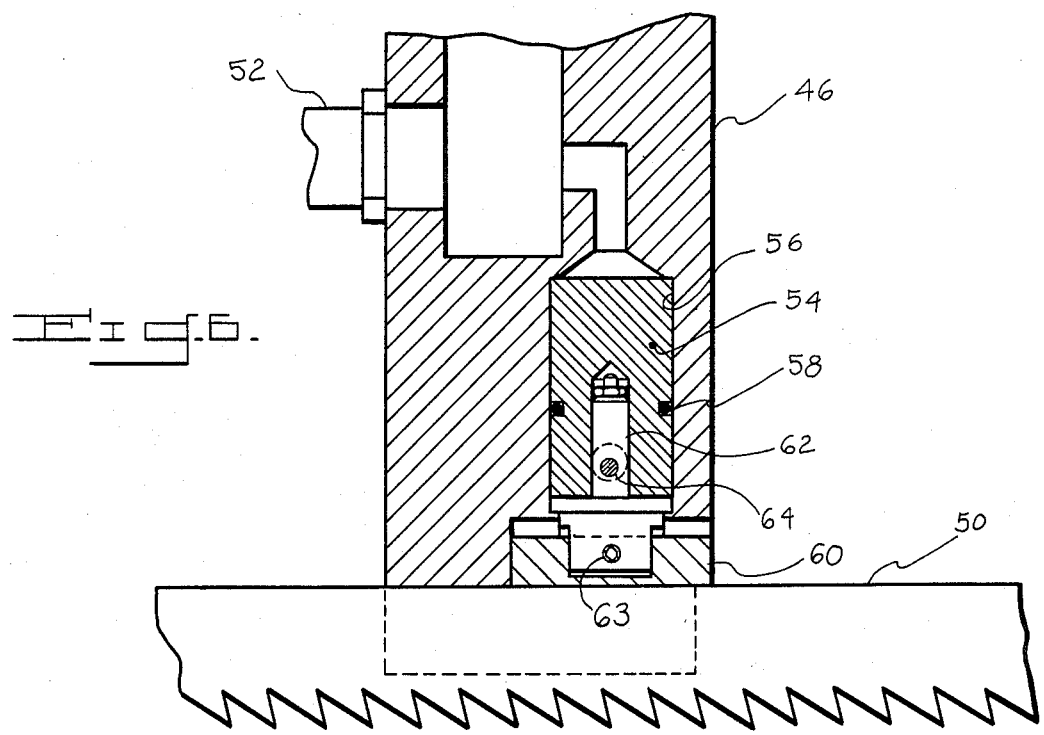

METHOD AND APPARATUS FOR OPERATING A BAND SAW

This application is a continuation-in-part of my co-pending application for "OSCILLATING BAND SAW MACHINE" Ser. No. 451,976, filed Dec. 21, 1982, now abandoned.

BACKGROUND OF THE INVENTION

This invention relates to band saw machines of the commerical type in which an endless saw blade band is looped about a pair of wheels, one of which is driven. The wheels are usually mounted in the saw head or housing, and in some of these machines the housing is hinged, while in other types it is mounted on vertical posts or guides. In some installations the blade is moved through the work, while in other types of machines the work is fed through the blade. Approximately midway between the wheels of all band saws, a pair of saw guides are located, which are spaced apart a distance greater than the cross-sectional size of work pieces to be cut by the machines. These saw guides hold the blade at a fixed angle, apply uniform pressure to the back edge of the band saw blade and define the cutting span of the blade. As the teeth of the blade cut through the work piece, all teeth in contact with the work have an equal, albeit, minimum force applied thereto. This causes the blade to bow outwardly from the kerf of the work and each tooth does not cut as full a chip as it is inherently capable of cutting. When cutting very hard or large work pieces, the cutting efficiency of conventional band saws is thus relatively low and this is manifested by relatively long cutting times and short blade life per unit cross-sectional diameter of the work piece.

A number of solutions have been suggested in the prior art to overcome these drawbacks. In many of these prior art approaches, the configuration of the band saw blade itself has been modified. One such proposal is disclosed in my prior U.S. Pat. No. 4,423,653 granted on Jan. 3, 1984, which refers to a number of earlier patents including U.S. Pat. Nos. 4,195,543; 4,160,397; 4,205,571; 1,850,478; 817,361; 286,706; and Canadian Pat. No. 883,602. In U.S. Pat. No. 4,205,571, dated June 3, 1980 to Bertini, a band saw blade is disclosed in which the rear edge of the blade is progressively tapered or inclined relative to the cutting edge and the minimum and maximum transverse sections of the blade are contiguous to define a sharp drop-off or cam-step between the gradually tapered back edge portions of the blade. The purpose of this construction is to effect a progressive or gradual change in the cutting angle of the blade relative to a work piece, first in one direction and then in the opposite direction. This type of gradual or progressive change in the cutting angle of the blade is also disclosed in Bertini U.S. Pat. Nos. 4,160,397 and 4,023,448. German Patent Application No. DE 27-48-822, dated Mar. 5, 1978, also shows a band saw having progressively tapered sections with a cam-step portion between the tapered sections.

In my U.S. Pat. No. 4,423,653, an improved band saw blade construction is disclosed in which the blade alternately cuts at two different angles relative to the work place. The blade dwells or remains at its extreme cutting angles for approximately seventy (70%) percent of the duration of each cycle. Thus the blade remains at each of its maximum angles of tilt for about thrity-five (35%) percent of each cycle of oscillation and is rapidly tilted to the opposite angle of tilt and again held fixed for approximately thirty-five (35%) percent of the cycle. Using this type of blade construction, the work is cut for a major percentage of cycle time at a fixed angle relative to the work which is in direct contrast to a saw blade having a progressively sloped or tapered back edge, such as disclosed in Bertini U.S. Pat. No. 4,160,397. Significantly, blades constructed in accordance with my U.S. Pat. No. 4,423,653, achieve a thrity (30%) percent improvement in cutting speed over blades of the type disclosed in the Bertini patent.

In Japanese Patent Applications Nos. 57-107729 and 57-163020, each disclose a band saw machine in which the saw is uniformly oscillated and at its extreme angles of tilt, the weight of the saw frame is allowed to drop or fall to achieve uniform cutting depth.

Blucher U.S. Pat. No. 4,127,045 discloses a step-cam mechanism which moves the band saw gradually toward the work and then instantaneously releases the band at the radial step of the cam 92. The step-cam thus provides an equivalent cutting action to the saw blade disclosed in Bertini U.S. Pat. No. 4,205,571, wherein the blade is gradually tilted to an ever increasing angle and then instantaeously released. As disclosed in the Blucher Patent, an improvement in cutting speed of about five (5%) percent is achieved, while in Applicant's concept of aternately varying the cutting angle between two extreme angles results in an improvement in cutting time of approximately fifty (50%) percent over a conventional blade.

The principal object of this invention is to provide an improved method of oscillating a band saw blade in a manner to achieve greatly improved cutting speeds and improved blade wear.

Another object of this invention is to provide an oscillating band saw machine in which the cutting angle of the band saw blade is alternately varied from one extreme cutting angle relative to the work to the opposite extreme cutting angle, whereby greatly improved cutting speeds and improved blade wear result.

A further object of this invention is to provide a machine which duplicates the oscillatory cutting action and performance achieved by the saw blade construction of my U.S. Pat. No. 4,423,653.

The above and other objects and advantages of this invention will be more readily apparent from the following description read in conjunction with the accompanying drawings in which:

FIG. 5 is a partial elevational view showing saw guides of a band saw illustrative of an alternative embodiment of this invention, and FIG. 6 is a cross-sectional view on an enlarged scale showing a blade oscillating means of the alternative embodiment of this invention.

Figure 1:
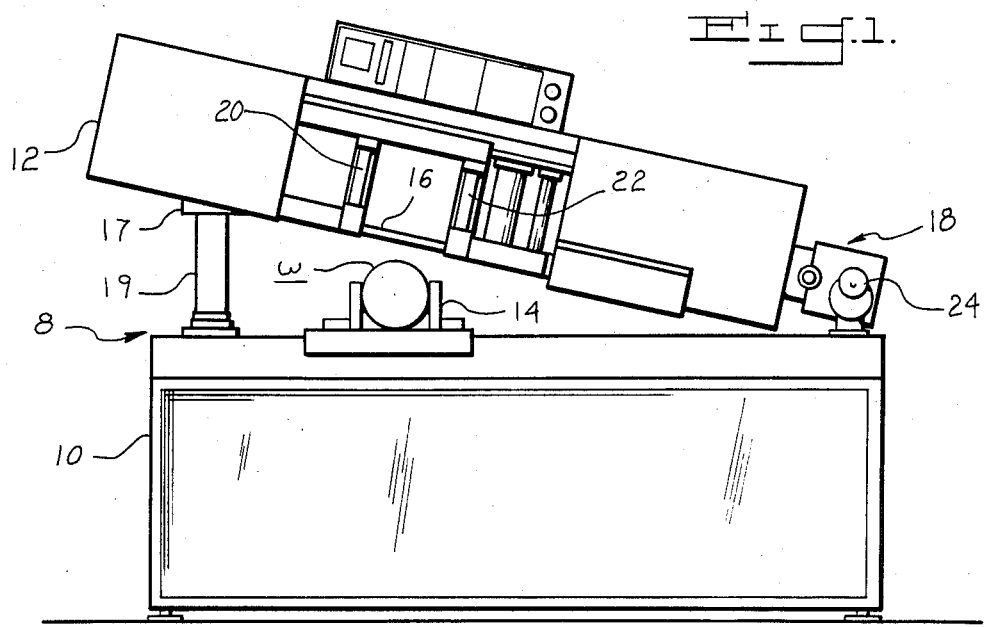
FIG. 1 is a side elevational view of the band saw illustrative of its oscillating mechanism.
Figure 2:
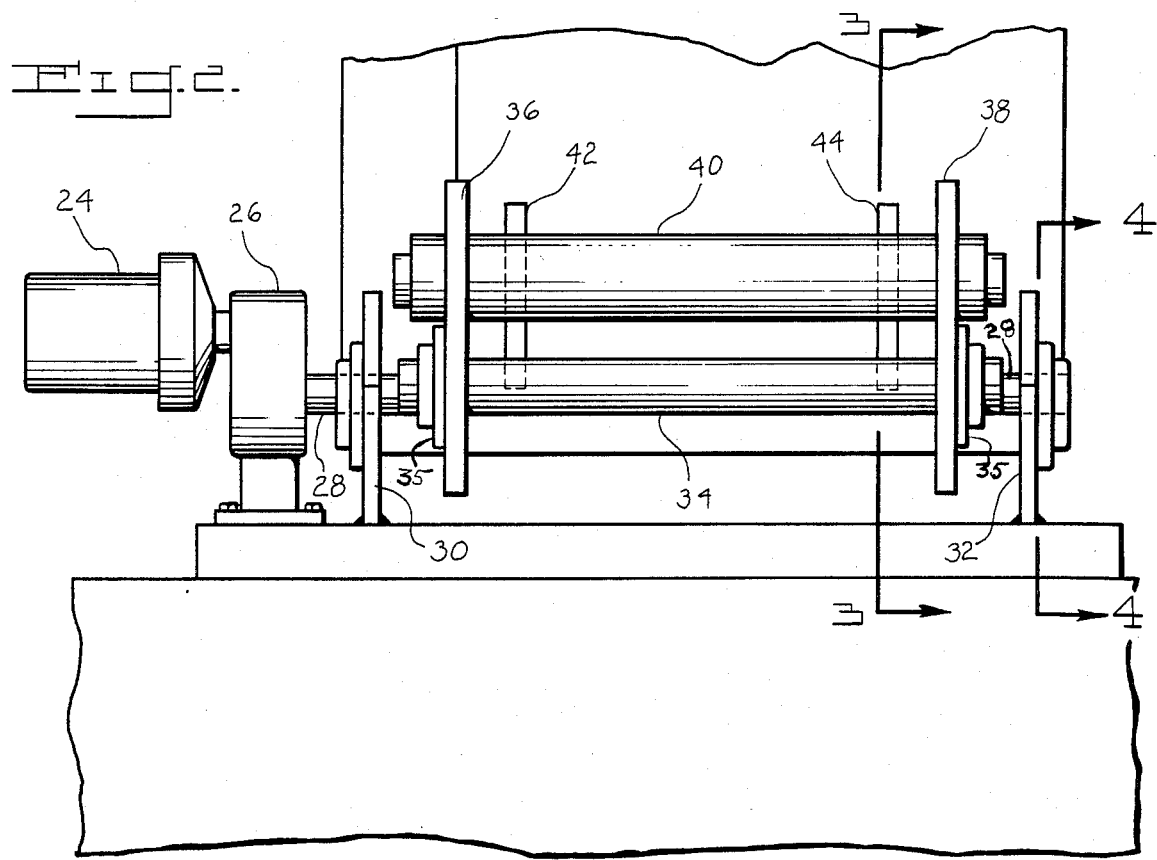
FIG. 2 is a rear elevational view of the band saw illustrative of its oscillating mechanism.

Referring in detail to the drawings, in FIG. 1 is shown a band saw machine 8 of the type embodying this invention. The machine includes a base 10 and a head or band saw housing 12. A work piece w is shown mounted on the upper surface of the base is held in fixed relation thereon by vise or clamping member 14.

The band saw head 12 comprises a hinged or pivotable housing in which a band saw 16 in the form of an endless loop is disposed around an idler wheel or pulley (not shown) disposed within one end of the housing and a drive wheel (not shown) disposed in the opposite end of the housing. As illustrated, the band saw housing is supported at its outer end by an hydraulic or pneumatic cylinder 17 and connecting rod 19 and at its other end by an eccentric drive mechanism 18 by which the entire housing is rocked or oscillated during a sawing operation. The cylinder 17 is pivotably mounted so that the housing can be rocked in a circular path which lies in the plane of the saw blade.

The lower span of the band saw 16 is disposed between a pair of spaced saw guide arms 20 and 22 which inlude guide blocks or rolls at their lower ends to hold the moving blade in a plane perpendicular to the work w and urge the blade against the work piece.

The drive mechanism includes an electric drive motor 24 coupled to a reduction gear box 26. The output shaft 28 of the gear box is rotatably supported by bearings in laterally spaced fixed mounting brackets 30 and 32, the lower edges of which are affixed to the upper surface of base 10.

Figure 3:
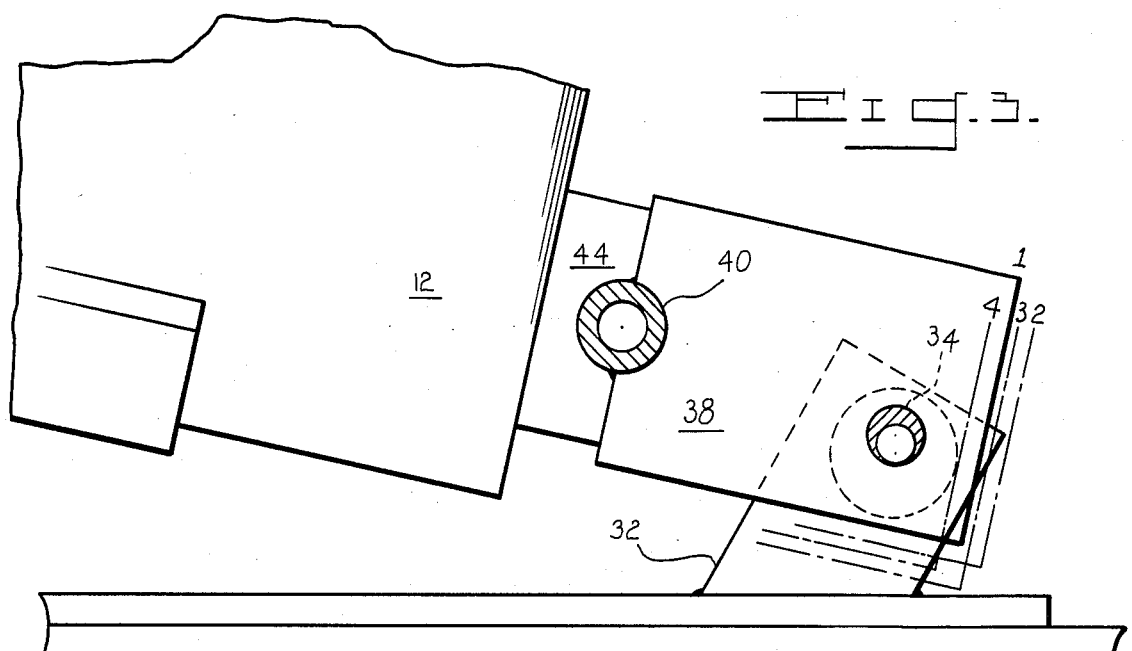
FIG. 3 is a section on an enlarged scale taken along line 3—3 of FIG. 2.
Figure 4:
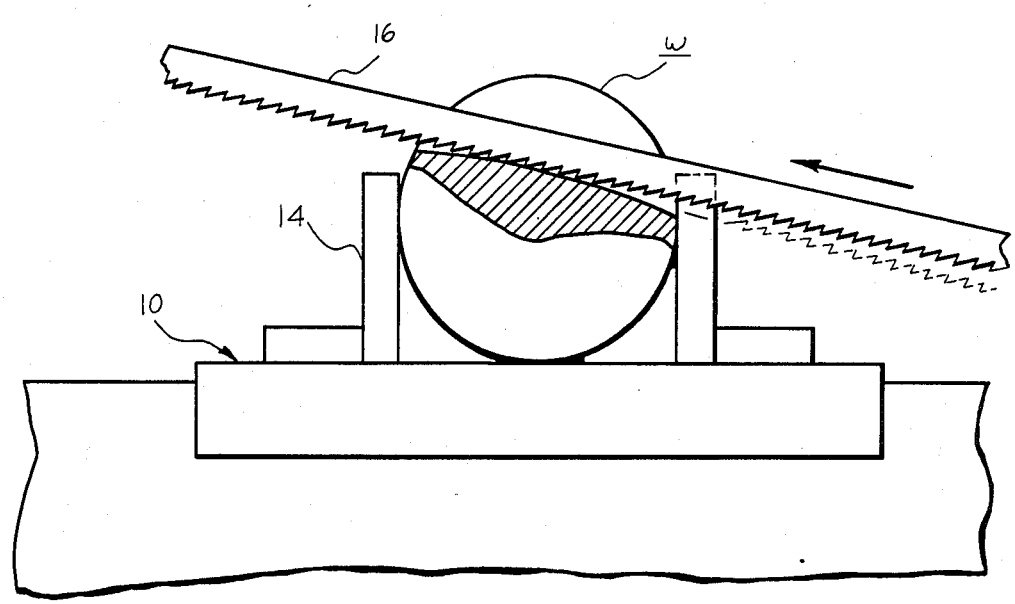
FIG. 4 is a section on an enlarged scale taken along line 4—4 of FIG. 2.

Disposed between the brackets 30 and 32 is a cam or eccentric shaft 34 which has its outer ends supported by ball bearings 35 fitted into circular cutouts in mounting plates 36 and 38 which are caused to oscillate in a response to rotation by the eccentric shaft 34, the eccentric being driven by rotation of shaft 28. As best shown in FIG. 3, the inner edges of the plates 36 and 38 are affixed to a cylindrical tubular member 40 which itself is attached to the edges of a pair of laterally spaced plates 42 and 44 that fixedly extend from the end of the housing 12. The center of rotation of cam shaft 34 has sufficient offset or eccentricity from the axis of shaft 28 to impart a predetermined oscillation or rocking action to the saw blade 16. As a result, the cutting span of the blade is alternately rocked from side-to-side in a plane normal to the work. The cycle of blade tilt is such that the angular rate of change of the blade is a minimum at its extreme angles of tilt and at its maximum rate of angular velocity while being moved intermediate its extreme angles. In effect, the blade is caused to dwell at its maximum angles of tilt and it has been discovered that remarkably improved cutting speeds and blade wear are achieved with this type of oscillating cycle which are commensurate to that achieved by the blade construction of my U.S. Pat. No. 4,423,653 Patent. A cam throw or offset of about ½ inch and a drive shaft speed of about 20 rpm have been found to provide a suitable oscillating cycle or periodicity for the angular variation of the saw blade. A cycle time of about 1–10 seconds is deemed suitable for purposes of this invention, while a 2–4 second cycle is considered preferable.

To evaluate the cutting efficiency of a band saw machine embodying this invention, a number of actual cutting tests were conducted using the same band saw machine for the tests of Examples I and II. For Example I, the machine was used in a conventional manner and for Example II, it was oscillated.

EXAMPLE I

A H.E.M. Band Saw machine was fitted with a standard type bimetal welded edge with M-42 steel cutting edge band saw 1"×0.035"×¾ vari-tooth and was run at 90 feet/minute with coolant PB-10, 3:1. A work piece of 304 stainless steel, 8" diameter bar stock was sawed in a series of through cuts and the time recorded for each slice as follows:

| CUT NO. | TIME/MIN. | CUT NO. | TIME/MIN. |
|---|---|---|---|
| 1. | 16.20 | 6. | 26.43 |
| 2. | 16.00 | 7. | 29.54 |
| 3. | 18.86 | 8. | 29.90 |
| 4. | 21.08 | 9. | 32.82 |
| 5. | 25.28 | 10. | 39.74 |
|  |  | Avg. | 25.59 |

EXAMPLE II

A H.E.M. Band Saw machine of the above type was modified so that an identical band saw blade was oscillated relative to the work as described above. Again, a 304 stainless steel 8" diameter bar was sawed through in a sequence of cuts and the following data recorded:

| CUT NO. | TIME/MIN. | CUT NO. | TIME/MIN. |
|---|---|---|---|
| 1. | 11.29 | 6. | 11.42 |
| 2. | 10.72 | 7. | 11.44 |
| 3. | 10.92 | 8. | 11.90 |
| 4. | 11.04 | 9. | 12.50 |
| 5. | 11.27 | 10. | 13.29 |
|  |  | Avg. | 11.44 |

Comparison of these two tests shows a remarkable improvement in all cutting times of better than fifty (50%) percent and it will also be noted that by cut No. 10, the saw blade in Example I was badly worn since its cutting time had increased by more than one hundred (100%) percent over its first few cuts. In contrast for the blade in Example II, cut No. 10 shows only about a fifteen (15%) percent increase in cutting time from its first to last cutting operations. In addition, the oscillating band saw in Example II was used to make a total of thirty (30) separate cuts and the time recorded for the last cut was 15.75 min. for a loss in cutting efficiency of only about forty (40%) percent.

An alternate embodiment of this invention is illustrated in FIGS. 5 and 6 and comprises of a band saw machine which may be of the conventional type, such as a "H.E.M." Band Saw or a "DO ALL" Band Saw wherein the cutting head of the machine is hinged at one end thereof. In this embodiment, the housing of the band saw machine is not rocked or oscillated but is maintained at essentially the same angle relative to the work while the cutting span of the saw blade 50 between saw guides 46 and 48 is itself deflected or tilted relative to the work w in a predetermined cycle, whereby the blade is alternately shifted between its maximum angles of tilt relative to the work and maintained at those angles for a major portion of each cutting cycle. It has been found that by maintaining the blade at its extreme angles of tilt relative to the work for about seventy (70%) percent of the time for each oscillating cycle that remarkable improvements in cutting speed and blade wear are obtainable. Indeed, these improvements are found to be in the order of fifty (50%) percent.

The effect of varying the cutting angle of the blade per se has been found to be generally similar to that achieved by alternately tilting the band saw head as described above in conjunction with FIGS. 1–4 and to that obtained by the saw blade construction disclosed in my U.S. Pat. No. 4,423,653.

There are, of course, a number of different types of mechanisms which could be used for changing the cutting angle of the blade and one such means is illustrated in FIGS. 5 and 6.

As best shown in FIG. 6, a cylinder 56 is bored into the lower end of the saw guide arm 46 and a tubular conduit 52 is connected to a pressurized fluid source, such as for a pneumatic or hydraulic system. Disposed within the cylinder is a small piston 54 equipped with a sealing ring 58 to form a fluid tight seal with the cylinder wall. A connecting pin 62 having its upper shank portion slidably fitted into a bore in the lower end of the piston 54 is adapted to transmit downward motion of the piston 54 to saw guide block 60 engaged with the upper edge portion of the band saw blade 50. The lower end of the connecting pin 62 is affixed as at 63 to the block 60 so that downward movement of the piston 54 is transmitted by the guide block 60 to the band saw 50.

A cross pin 64 extends transversely through the connector pin 62, piston 54 and a vertically elongated slot 65 in the wall of cylinder 46. This construction serves to retain the several movable components in assembled relation while permitting reciprocable movement of piston 54. Means is provided to apply fluid high pressure intermittently to piston 54 and to release such pressure. When the piston 54 has been moved downward in the saw guide arm 46, the leading end portion of the blade 50 in relation to its direction of movement, as indicated by the arrow in FIG. 5, is deflected downward by the guide block 60 as it advances past the arm 46. This imparts a tilt in the span of blade 50 moving longitudinally between the saw guides 46 and 48. The blade is held by the piston in this angular orientation for a predetermined period of time and is retracted when high pressure fluid in the cylinder 56 is released. Tension of the blade pressure against the work will cause the blade 50 to resume to its undeflected condition, that is both the leading and trailing end portions of the blade are again disposed normal to the saw guides 46 and 48. In this condition, the blade is in effect moved to its opposite extreme angle of tilt and allowed to remain in this position for the same period of time as it was held in its other extreme angle. In this embodiment, therefore, the cutting span of the blade per se is alternatively tilted and released in an intermittent or cyclical rocking action. Operation of the piston is controlled so that the blade is preferably maintained in its tilted disposition relative to the work for the major portion of each cutting cycle, such as about seventy 70%) percent of oscillatory cycle for example.

EXAMPLE III

To evaluate the performance of this embodiment, a series of cutting tests were conducted using a standard "DO ALL" C-80 type Band Saw. The machine was fitted with a standard type bimetal, welded edge band saw having an M-42 steel cutting edge 1"×0.035"×¾ vari-tooth. The saw was run at a speed of 120 feet per minute using a Houghton 3:1 coolant and the machine was operated in a conventional manner. A series of through cuts were made on 304 stainless steel bar stock of 4 inch diameter. The time for each complete cut-off was recorded as follows:

| CUT NO. | TIME/MIN. | CUT NO. | TIME/MIN. |
| --- | --- | --- | --- |
| 1. | 7.82 | 11. | 9.38 |
| 3. | 7.61 | 13. | 9.90 |

-continued

| CUT NO. | TIME/MIN. | CUT NO. | TIME/MIN. |
| --- | --- | --- | --- |
| 5. | 5.75 | 15. | 10.20 |
| 7. | 6.64 | 17. | 10.98 |
| 9. | 9.19 | 19. | 11.41 |
| | | Avg. | 8.89 |

EXAMPLE IV

For this Example all the conditions of Example III were duplicated, except that the fluid pressure operated piston 54, as shown in FIG. 6, was operated on a 2 second cycle i.e., 1½ seconds "on" and ½ seconds "off". It is considered that various cycles could be used as long as the blade angle is intermittently varied by a 2–4 second cycle and is maintained at its fixed angles of tilt for a major portion of the cycle. With the angle of the cutting span portion of the blade being alternately tilted and held first at one then at the opposite cutting angle, the following results were obtained:

| CUT NO. | TIME/MIN. | CUT NO. | TIME/MIN. |
| --- | --- | --- | --- |
| 1. | 3.91 | 11. | 3.78 |
| 3. | 3.49 | 13. | 3.95 |
| 5. | 3.03 | 15. | 4.12 |
| 7. | 3.37 | 17. | 4.26 |
| 9. | 3.86 | 19. | 4.21 |
| | | Avg. | 3.80 |

With this blade, the tests were continued for 35 cuts and the final cutting time was 5.22 minutes.

A comparision of these two tests again showed a most surprising and dramatic improvement in cutting efficiency and blade wear.

Both embodiments of this invention disclosed herein manifest a remarkable improvement in cutting speed and blade wear for a band saw in which the blade angle, as presented to the work, is alternately shifted from one extreme angle of tilt to the opposite extreme angle of tilt and dwells at such angles for a major portion of each cutting cycle.

While cutting efficiencies were achieved by either oscillating the band saw machine or the cutting span of the blade, it will be apparent to those skilled in the art that means could also by provided, whereby the work itself could be manipulated relative to the saw blade with equivalent results in faster cutting speed and longer blade wear.

Having thus disclosed this invention what is claimed is:

1. Oscillating band saw machine including a base portion, a housing pivotably supported on the base and having therein a pair of longitudinally spaced pulleys with an endless band saw looped about said pulleys and being driven along a given path and a pair of longitudinally spaced saw guides engaged with the outer edge of the saw blade for urging a cutting span of the blade against a work piece, said band saw machine comprising an eccentric drive mechanism mounted on said base and including a bracket attached to one end of said housing for oscillating said bracket about a circular path whereby said one end of the housing is cyclically raised and lowered relative to said base whereby the angular orientation of the cutting span of the saw blade is continuously and automatically tilted relative to a work piece supported on said base, the angular rate of change of the cutting span of the blade as the housing is tilted by said eccentric drive being a maximum when the blade is cutting at the center of the work and a minimum when the blade is tilted to the maximum angles relative to said work so that a greater percentage of the cutting time cycle occurs at the outer edge portions of the work.

2. Oscillating band saw machine as set forth in claim 1, in which the weight of said housing is supported by a fluid cylinder at a point spaced a substantial distance from said eccentric drive and in which said drive mechanism includes a cam shaft drivingly engaged with a pair of laterally spaced brackets affixed to said one end of the housing.

3. Oscillating band saw machine as set forth in claim 2, in which the cam shaft is mounted in bearings provided in said laterally spaced brackets, said brackets being affixed to a transverse structural member attached to a pair of laterally spaced plates which extend outwardly from said one end of the housing.

4. Oscillating band saw machine as set forth in claim 3, in which the time for one cycle of tilting said frame is from two to four seconds.

5. Oscillating band saw machine including a base portion, a housing pivotably supported on the base at its opposite ends and including a pair of longitudinally spaced pulleys with an endless band saw looped about the pulleys and being driven along a given path and a pair of longitudinally spaced saw guides engaged with the outer edge of the saw blade for urging a cutting span of the blade against a work piece, said band saw machine comprising an oscillating drive mechanism disposed on at least one of said saw guides and including means for tilting the cutting span of said blade relative to the base on which a work piece is supported and being controlled so that the cutting span is tilted to one extreme cutting angle, maintained at said angle for a predetermined time and thereafter moved to and maintained at a second extreme cutting angle for said predetermined time, whereby the saw blade is alternately tilted to opposite extreme angles for cutting said work piece, said cutting span being maintained at said extreme cutting angles for at least approximately seventy (70%) percent of the oscillating cycle of the cutting span of said blade.

6. Method of cutting a work piece with a band saw comprising the steps of fixing a work piece in a position to be cut by a longitudinally movable cutting span of the blade, driving the blade longitudinally and simultaneously tilting the blade in a cycle of oscillation relative to the work being cut, said cycle including movement first to one extreme angle of tilt and thereafter to an opposite extreme angle of tilt, the blade being tilted at its maximum rate of angular movement when it is being moved between said extreme angles and at its minimum rate when disposed at its extreme angles of tilt.

7. Method of cutting a work piece as set forth in claim 6, in which said blade is caused to dwell at its extreme angles of tilt.

8. Method of cutting a work piece as set forth in claim 7, in which the blade is tilted relative to the work so that during each complete cycle of oscillation, the blade dwells at its extreme cutting angles relative to the work piece for at least approximately seventy (70%) percent of the time.

* * * * *